Feb. 23, 1954    A. P. KRUEGER ET AL    2,670,043
FEED CONTROL FOR TAPE-DISPENSING DEVICES
Filed March 29, 1947    3 Sheets-Sheet 1

Inventors
Alfred P. Krueger
and Oscar P. Erhardt
By Rockwell Fuchslow
Attorneys

Feb. 23, 1954   A. P. KRUEGER ET AL   2,670,043
FEED CONTROL FOR TAPE-DISPENSING DEVICES
Filed March 29, 1947   3 Sheets-Sheet 2

Inventors
Alfred P. Krueger
and Oscar P. Erhardt
By
Rockwell Buchlow
Attorneys

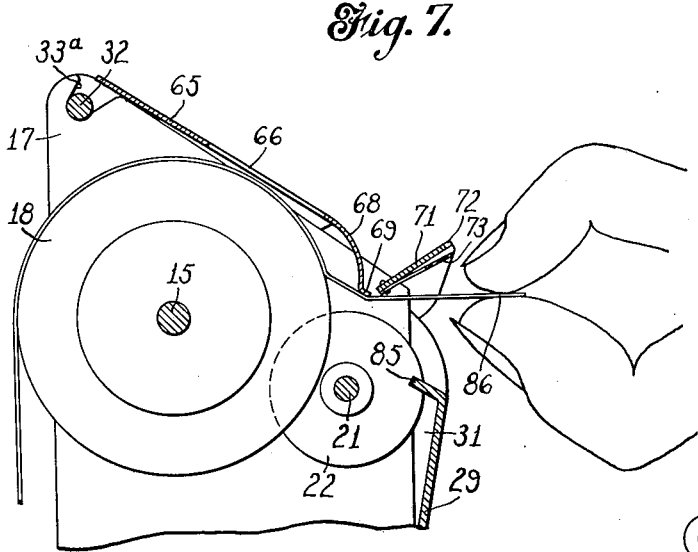
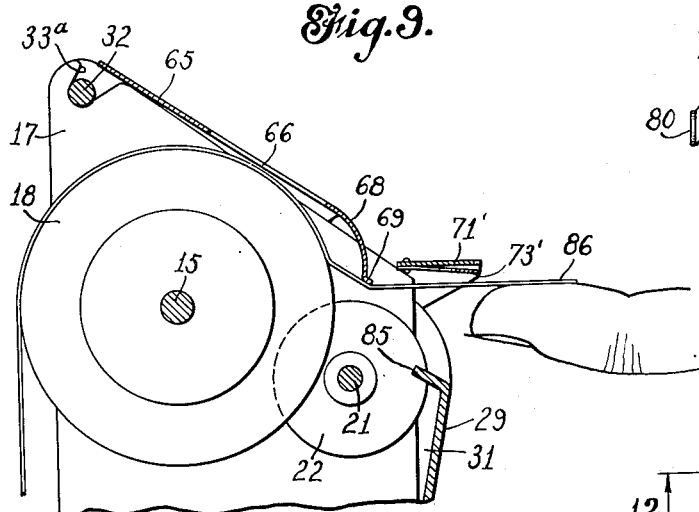
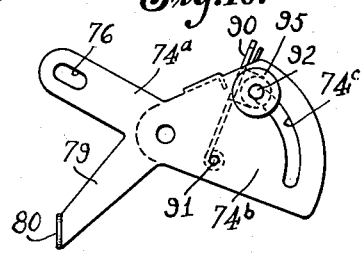
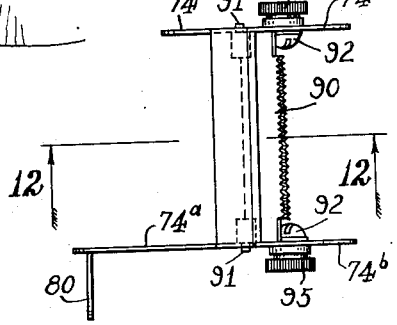
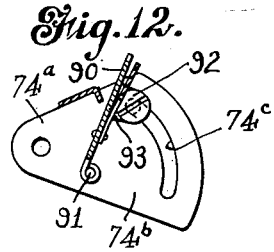

Patented Feb. 23, 1954

UNITED STATES PATENT OFFICE 2,670,043

FEED CONTROL FOR TAPE-DISPENSING DEVICES

Alfred P. Krueger, Stratford, and Oscar P. Erhardt, Derby, Conn., assignors to Derby Sealers, Incorporated, Derby, Conn., a corporation of Connecticut Application March 29, 1947, Serial No. 738,032

12 Claims. (Cl. 164—84.5)

This invention relates to a tape-dispensing device, and more particularly to a device for dispensing pressure-sensitive tape.

Tape of the character referred to above is tacky or clingable upon one surface, and for this reason some difficulty has been encountered in the past in providing an apparatus which will properly draw or feed the tape from the supply roll upon which it is wound and deliver it, such that a free end may be grasped by the operator in such a manner that it may be readily applied to the package or other article with which it is to be used. The tape being tacky upon one surface will cling to any object with which it comes in contact, and for this reason it is desirable that the user of the tape handle it as sparingly as possible and preferably apply it to a package, for example, with the use of one hand, or even one finger, in contact with the tacky side of the tape.

It is also contemplated by the present invention to provide a power-operated machine, or one which, as illustrated, is driven by an electric motor, so that the operator will be relieved of the effort of drawing the tape from the roll. In many instances, tape of this character is used in relatively short lengths. Therefore, in order to prevent waste, it is desirable that, particularly in a power-operated dispensing apparatus, the device be so constructed that the feeding movement may be stopped at any desired time, and that it be sufficiently slow so that the desired lengths, and no more, may be fed from the machine.

In the device illustrated, the feeding movement may be initiated by a pull upon the free end of the tape in a direction to draw it from the machine. That is, the operator may merely grasp the free end between his fingers or engage one finger with the tacky side of the tape, and, by exerting slight tension thereon, energize the motor to initiate the feeding movement of the machine, this feeding movement continuing so long as tension is exerted upon the tape and being discontinued when the tension is relieved.

An alternative way of operating the machine is also illustrated in that the switch which controls the motor may be manually tripped and the motor will be energized, and the tape delivered from the machine as long as the switch is held in closed position.

One object of the present invention is to provide a new and improved device for dispensing pressure-sensitive tape.

A further object of the invention is to provide a device for dispensing pressure-sensitive tape, which may be power-operated and which may be readily controlled, so that the operator may conveniently secure the desired length of tape from the machine.

A still further object of the invention is to provide a motor-operated device for dispensing pressure-sensitive tape so arranged that the motor will be energized by a pull upon the free end of the tape in a direction to draw it from the machine, and will continue to operate so long as this tension is maintained, and will discontinue its operation when the tension is discontinued.

Other objects of the invention reside in an arrangement of the parts which enables the tape to be engaged with the feeding means in a convenient manner when a new supply is placed in the machine; which will properly strip the tape from the feeding mechanism, so that a free end will be delivered from the machine so that it may be grasped and torn off against a severing member; and also to provide mechanism whereby the machine may be rendered inoperative at will, and also rendered inoperative when a new roll of tape is being installed.

To these and other ends the invention consists in the novel features and combinations of parts to be hereinafter described and claimed.

In the accompanying drawings:

Fig. 7 is a similar view showing the tape being fed from the machine;

Fig. 9 is a view similar to Fig. 8, showing the tape being fed from the machine;

Fig. 10 is a modified form of severing mechanism and switch, the severing member being adjustable;

Fig. 11 is a top plan view of the mechanism shown in Fig. 10; and

Fig. 12 is a sectional view on line 12—12 of Fig. 11.

Figure 1:
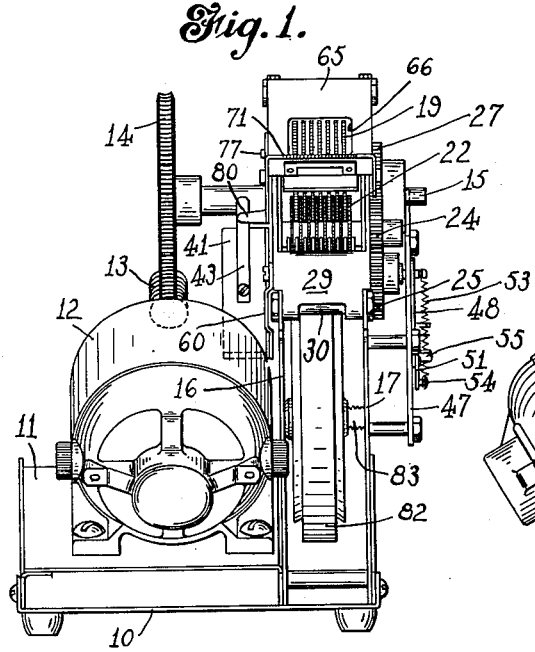
Fig. 1 is a front elevational view of a tape-dispensing machine embodying our invention.

To illustrate a preferred embodiment of our invention, we have shown in Fig. 1 of the drawings a tape-dispensing device comprising a supporting base 10 having a platform 11, upon which is supported in an inclined position the driving motor 12, the shaft of which carries a worm 13 in engagement with a worm wheel 14. This worm wheel is secured to a shaft 15 rotatably mounted in side plates 16 and 17 supported by, and upstanding from, the base 10.

Secured to the shaft 15 between the plates 16 and 17 is the feeding drum 18. As shown more especially in Fig. 1, this drum may comprise a plurality of spaced disks 19 having roughened or knurled peripheral edges, so that the tacky side of the tape will properly cling to the peripheral edges of these disks and be drawn from the roll.

Figure 5:
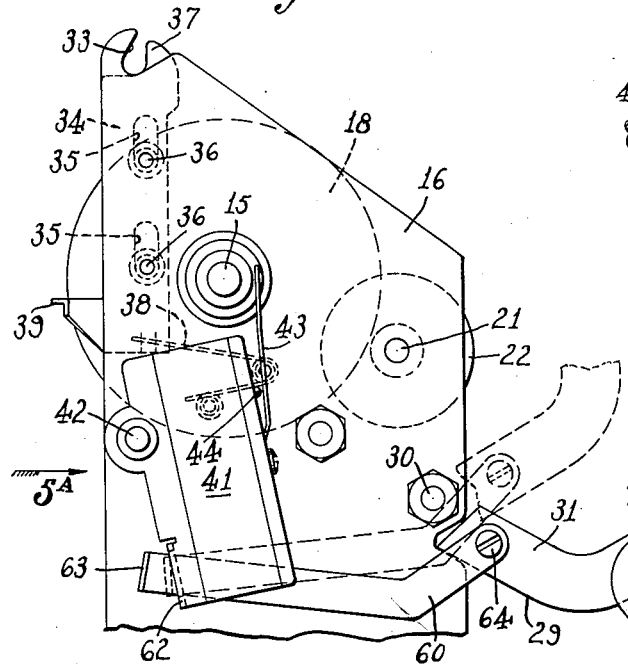
Fig. 5 is a view similar to Fig. 3, with certain parts shown in another position.
Figure 5A:
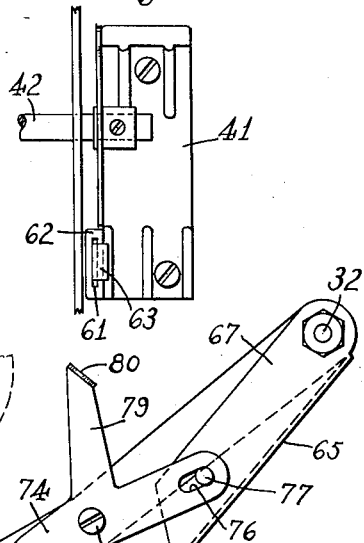
Fig. 5A is a detail view of the switch mechanism, looking in the direction of the arrow 5A on Fig. 5.

Also rotatably mounted in the plates 16 and 17 is a shaft 21 having a plurality of toothed stripping disks 22 thereon, these disks, as shown in Figs. 1 and 5, being adapted to extend between the disks 19 so as to engage the tape as it is drawn from the roll by the feeding disks. The stripping disks together constitute what may be termed a stripping drum, and in order that they may also be stripped from the tape, so that the latter will not cling thereto, it is preferable to operate the stripping disks at a greater peripheral speed than that of the feeding disks. To this end, a pinion 24 is secured upon the shaft 21, which pinion is adapted to engage the teeth of an idler gear 25 rotatably mounted on a stud shaft 26 on the outer plate 17, which gear 25 is in turn adapted to engage the gear 27 mounted upon the shaft 15, so that this stripping drum, as well as the feeding drum, will be rotated by the motor 12 through the worm 13 and worm wheel 14.

As previously stated, the feed disks 19 have broken peripheral edges in that they are roughened or knurled, and likewise the stripping disks have broken peripheral edges, the edges of both disks engaging the tacky side of the tape. By providing the feed disks with broken peripheral edges the adherence of the tape to these disks can be regulated as desired. It is, of course, necessary to have sufficient adherence of the tape to the feeding disks to draw it from the supply roll. On the other hand, it is undesirable to have too great a degree of adherence of the tape to the feeding disks as this will cause the tape to curl as well as presenting increased resistance to the stripping operation.

A cover mechanism, which in this instance also includes a trip member for the motor switch, as will be hereinafter explained, is provided for the feed mechanism, this structure comprising, as illustrated, a lower plate 29 pivoted to the frame members 16 and 17 upon a pivot pin 30. To the side edges of the member 29 are secured parallel L-shaped arms 31, these arms extending upwardly upon the outside of the members 16 and 17 and being secured together at their upper ends by a pin 32, which is adapted to be received in open-mouthed slots 33 and 33a provided at the upper ends of the frame members 16 and 17.

In order that the cover may be latched in closed position, a slide member 34 is movably mounted on the member 16, this slide member being provided with elongated slots 35 adapted to receive pins 36 secured to the frame member. At its upper end, this slide is provided with a latch finger 37 designed to engage the pin 32 and hold it securely in the slot or recess 33. The member 34 is urged upwardly by a spring 38 suitably mounted upon the member 16, and is provided with a projecting thumbpiece 39, which may be engaged by the operator so as to press the slide member 34 downwardly in opposition to the action of the spring, and thus move the finger 37 from engagement with the pin 32, and permit the cover to be swung from the closed position shown, for example, in Fig. 4 to the open position shown in Fig. 5.

The motor is adapted to be controlled by the switch mechanism, designated as a whole by the reference character 41, this mechanism being of the usual micro-switch type and being carried by a pin 42 rockably mounted in the plates 16 and 17. The switch mechanism is provided with a resilient or flexible operating member 43 which acts upon a plunger 44 to close the switch contacts and thus energize the motor 12 in the usual manner, and, in its normal or "on" position, the switch mechanism 41 stands in the position shown in Figs. 3 and 4, so that the member 43 may be moved toward the switch case to depress the plunger 44, as shown, for example, in Fig. 4. However, the switch case may be swung upon the pin 42 by rotation or oscillation of the latter, so that it stands in the position shown in Fig. 5. In this position, the member 43 stands substantially in engagement with the shaft 15 and cannot be moved toward the left, as shown in this figure, to a sufficient extent to close the switch.

Figure 2:
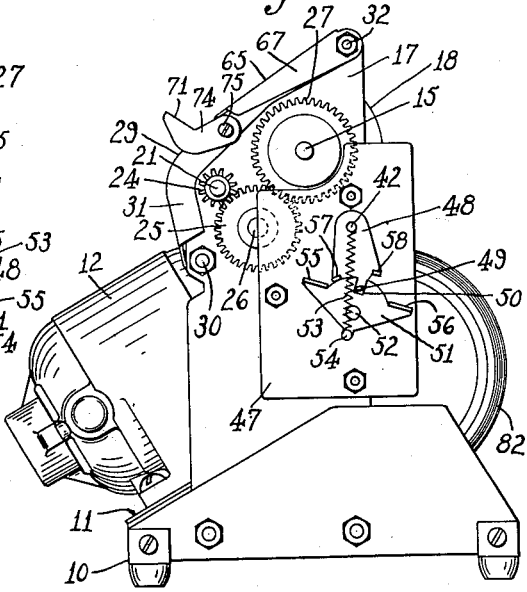
Fig. 2 is a side elevational view thereof.

The position just described is the "off" position of the switch in that, while it is in this position, the motor cannot be operated, and the switch may be moved to this position in one or two ways, which will now be described. Referring particularly to Fig. 2 of the drawings, the pin 42, upon which the switch case is mounted, not only extends through the plate 17 but also extends through an additional plate 47 secured in spaced relation to the plate 17. On the projecting end of the pin 42 is rigidly secured a depending arm 48, this arm being provided at its lower end with a finger 49 extending into a recess 50 in an actuator 51 pivoted at 52 to the plate 47. A tension spring 53 is secured at one end to the pin 42, and at its other end to a point 54 on the actuator 51 below the pivot 52. The actuating member 51 is provided with lugs or ears 55 and 56, one at each side, so that either may be engaged by the finger of the user of the device, and the actuating member 51 rocked in either direction about its pivot 52. This rocking of the actuating member serves to rock the arm 48 and the pin 42, thus moving the switch 41 from the position shown in Figs. 3 and 4 to that shown in Fig. 5, and vice versa.

Figure 3:
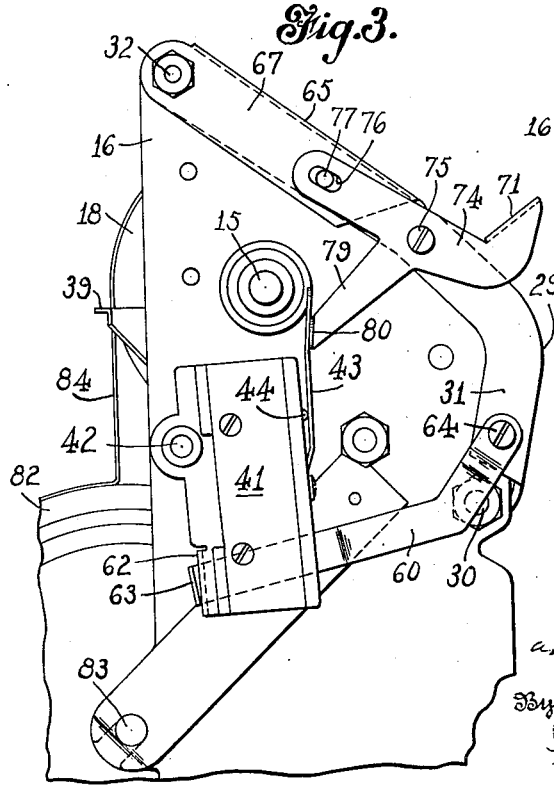
Fig. 3 is an enlarged partial side elevation of the opposite side of the machine.
Figure 4:
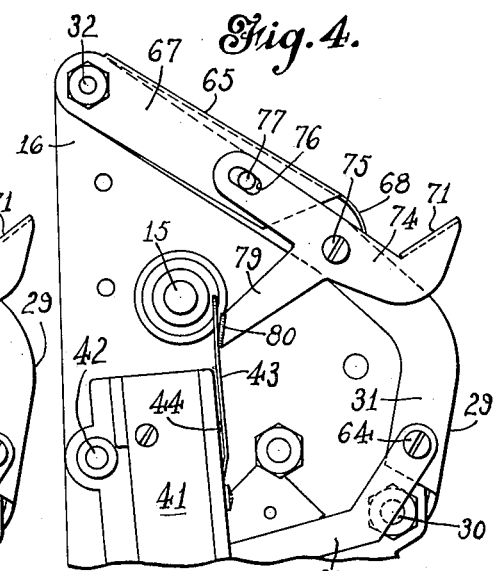
Fig. 4 is a view similar to Fig. 3, showing the parts in the position in which the switch is closed to energize the operating motor.

In Fig. 2 of the drawings, the arm 48 and switch-actuating member 51 are shown in the position which they occupy when the switch case is in the "on" position, or that shown in Figs. 3 and 4. It will be noted that in this position the spring 53 lies to the left of the pivot 52 and tends to hold the parts in this position with the upper edge of the actuator in engagement with a lug 57 on the arm 48. A corresponding lug 58 is provided at the other side of the arm 48, and, if the lug 55 is pressed downwardly and the switch actuator 51 rocked to the left until the upper edge of the actuator engages the lug 58, the switch mechanism 41 will be moved to the "off" position shown in Fig. 5, and, in this position of the parts, the spring 53 will have moved past dead center position and will lie to the right of the pivot 52, thus tending to hold these parts in the position to which they are moved.

It is also desirable to provide means for throwing the switch mechanism 41 to its "off" position when the cover mechanism is open for any purpose, such as to install a new roll of tape. To this end, a link 60 is pivoted to the arm 31 of the cover mechanism adjacent the switch, this arm extending freely through a slot 61 in the plate 62 secured to the switch and being provided with a turned end or lug 63 on the rear side of the plate 62. The link 60 is pivoted to the arm 31 at 64, and this pivot is so disposed with relation to the pivot pin 30 about which the arm moves that, when the latter moves in either direction from its extreme position, the link 60 will be moved past dead center position with respect to the pivot pin 36 and thus draw the lower end of the switch case to the right, as shown in Figs. 3, 4 and 5, or to its "off" position. That is, when the cover mechanism is moved from the position shown in Fig. 3 to that shown in Fig. 5, the link 60 will be moved toward the right and will at once move the switch case to its "off" position. During the remainder of the downward movement of the arm 31, the link 60 will again move toward the left (after it is past dead center position), and the free end of the link will slide freely through the slot 61, so that it will not move the switch to its "on" position. Similarly, the cover can be closed when the parts are in the position shown in Fig. 5 without affecting the position of the switch. However, if, while the cover is open, the switch is moved to its "on" position manually, then, when the cover is moved to closed position from the position shown in Fig. 5, it will first move the switch to its "off" position. Therefore, the cover mechanism is so arranged that, when it is moved in either direction, the switch mechanism will always be moved to its "off" position if it does not already stand in such position.

The switch-operating member 43 may be actuated in one or two ways as will now be described. Pivoted upon the pin 32 of the cover frame is a cover plate 65 provided with an opening 66 through which the feed drum is exposed and also provided with side flanges 67 lying upon the outside of the arms 31. At its lower end, this cover plate is curved downwardly as shown at 68 to provide a follower 69 adapted to engage the tape when tension is applied thereto by a pull upon the free end thereof, as shown in Fig. 7, so that, when the tape engages the follower 69, the cover plate will be rocked slightly in an upward direction about its pivot 32. Also pivoted to the arms 31 is a tear-off or severing member 71 which normally lies above the tape and which may be provided with a serrated edge 72 against which the tape may be torn off by an upward pull thereon. This member is also provided with a resilient stripper 73, so that the unsevered end of the tape will not stick to it, but will be urged therefrom after a severing operation. To the opposite ends of the member 71 are rigidly secured arms 74 pivoted to the members 31 at 75, the free end of one of these arms being elongated and provided with a slot 76 loosely receiving a pin 77 secured to one of the flanges 67 of the cover member. These two members are thus connected, so that, when the cover member is rocked upwardly as shown in Fig. 4 about its pivot 32, the severing member will be rocked downwardly about its pivot 75 due to this pin and slot connection. Secured to the arm 74, which is adjacent the plate 16 and, therefore, adjacent the switch 41, is a switch-actuating arm 79 having a laterally turned end 80 designed to engage the switch-operating member 43 and close the switch to actuate the motor.

Thus, as will be apparent, the switch member 43 may be moved to close the switch, either by a pull upon the tape which engages the follower 69 and moves the cover member upwardly about its pivot member 32, or by a light pressure of the operator directly upon the severing member 71. Either of these operations will move the arm 79 in a direction to close the switch and energize the motor.

A supply roll 82 of tape may be mounted upon a shaft 83 rotatably carried by the members 16 and 17, the tape extending upwardly in a substantially vertical direction, as shown at 84 in Fig. 3, and being trained over the feed drum 18.

Stripper fingers 85 may be rigidly secured to the member 29 and extend inwardly between the stripping disks 22. These fingers may not ordinarily be required, but in the event that the tape, for some reason or another, tends to adhere to the stripper disks and tends to ride around with these disks instead of being projected from the machine, it will positively be stripped by these fingers, so that the end of the tape will stand in a free position, as shown at 86 in Fig. 6, where it may readily be grasped by the operator.

Figure 6:
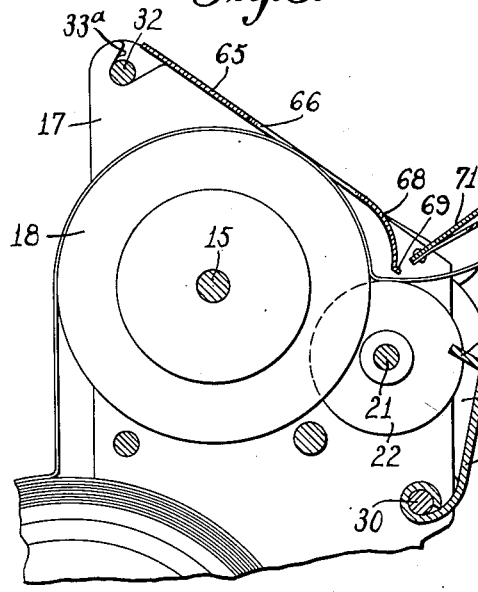
Fig. 6 is a sectional view through the feeding and stripping mechanism.
Figure 8:
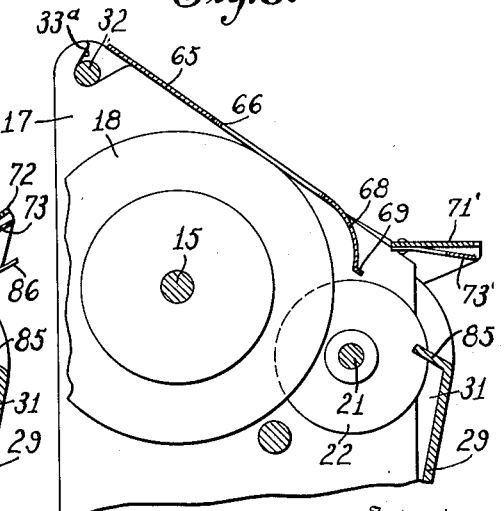
Fig. 8 is a view similar to Fig. 6, showing a modified form of severing member.

In Figs. 8 and 9 of the drawings, we have shown a slightly modified form of our invention in which the severing member 71' and stripper 73' secured thereto are arranged at a slightly different angle with respect to the path of the tape or with respect to the cover member 65 in that the severing member 71' stands in a substantially horizontal position, as shown in these figures, instead of an upwardly tipped position, as shown in Figs. 6 and 7. Otherwise, the mechanism shown in Figs. 8 and 9 is the same as that shown in connection with the figures of the drawing previously described.

The operation of the device will now be described. In placing a new roll of tape in the machine, the cover mechanism is first moved to the position shown in Fig. 5. With the new roll in place on the shaft 83, a suitable length of the free end of the tape is engaged with the periphery of the feed drum 18, so that there will be sufficient adherence between the tape and the drum to draw the tape from the roll when the drum is operated. The cover mechanism may then be closed or moved from the position shown in Fig. 5 to that shown in Figs. 3 and 4. It will be recalled that movement of the cover in either direction will move the switch mechanism 41 to its "off" position, so that it will now be necessary to move the switch actuator 51 to the position shown in Fig. 2, in order to restore the switch mechanism to its "on" position. Thereafter, a slight pressure downward on the severing member 71 will energize the motor and effect operation of the feeding mechanism which will draw the free end of the tape through the machine until it reaches the position shown in Fig. 6, for example, in which it may be grasped by engagement of the thumb or forefinger of the operator with the tacky side of the tape.

The free end of the tape will usually stand in the position shown in Fig. 6, and it may be engaged by the thumb or forefinger of the operator being placed beneath, or against the tacky side of, the tape, and the tape pressed upwardly against the stripping member 73 to cause it to adhere to the finger. When a slight length has been drawn out to the position shown in Fig. 7, it may be grasped between the thumb and forefinger as shown. When a slight tension is exerted upon the tape to straighten it out, a portion adjacent its free end will contact the follower 69 and thus raise the member 65 from the position shown in Fig. 6 to that shown in Fig. 7, thus rocking the arm 79 from the position shown in Fig. 3 to that shown in Fig. 4 and closing the switch mechanism 41 to energize the motor. Rotation of the motor shaft will actuate the feed and stripper drums and deliver tape from the machine so long as sufficient tension is applied to the free end thereof to hold the switch member 43 in position to close the switch. Due to the worm and worm wheel drive, the feed will be comparatively slow, so that the user of the device can secure the desired length of tape and no more, as, when the desired length has been fed, he merely discontinues tension upon the free end of the tape and the switch member 43 returns to its open position by its own resilience. The operator then tears off the free end of the tape against the severing edge 72, and the stripper 73, which has been moved against the member 71, will be moved away from this member again by its own resilience and strip the free end of the tape from the edge 72 as it tends to cling thereto, thus leaving it in the position shown in Fig. 6, where it may be readily grasped between the thumb and the forefinger for a subsequent operation.

Due to the pin and slot connection between one of the arms 74 of the severing member 71 and one of the flanges 67 of the cover, the latter will be moved downwardly by upward pressure on the severing member. Thus, when the tape is moved against the latter to be torn off, the severing member will be moved upwardly to a slight extent and hold the cover in depressed position, and the switch-actuating arm 79 will be moved away from the member 43 to open the switch. With this arrangement, the feed will always be stopped during the severing operation.

If desired, the operator may merely press downward lightly upon the severing member 71 and thus actuate the switch member 43. The free end of the tape will in such case be fed out from the machine in as great a length as is desired. This is an alternative method of operation, although it will probably not be the usual method.

If the operator grasps the tape between the thumb and forefinger, as shown in Fig. 7, the tape will tend to cling to the thumb. If, however, he desires it to cling to his forefinger instead, he may merely press his forefinger below the tape, as shown in Fig. 9, pressing the tape upwardly against the stripper 73 until it clings to his finger and then apply tension to the tape in this manner sufficient to set the motor into operation. In such event, it will be found more convenient for the severing member 71 to be set at a susbtantially horizontal position, as shown in Figs. 8 and 9. Thus, with the present device, the operator may engage the tape with either his thumb or forefinger applied to the tacky side of the tape, and in either case he can exert sufficient tension on the tape to move the arm 79 and actuate the switch member 43.

It may be found convenient to arrange the severing member so that it is adjustable from the position shown in Fig. 7 to that shown in Fig. 8, so that merely by adjusting the position of this member the device may be adapted either for the operation shown in Fig. 7 or for that shown in Fig. 9. We have shown such an adjustable severing member in Figs. 10, 11 and 12 of the drawings.

In this embodiment of our invention, the arms 74ª, which correspond to the arms 74 previously described, are provided with relatively broad outer ends, as shown at 74ᵇ, these arms being provided with slots 74ᶜ. The severing member 90 is pivoted to these arms at its rear end as at 91, and the slots 74ᶜ are of arcuate shape about this pivot. Screws 92 are carried by lugs 93 secured to the severing member, which screws extend through the slots 74ᶜ and are provided with nuts 95 by which they may be tightened. Thus, by loosening the nuts 95, the severing member 90 may be moved to any adjusted position within the limits of the slots 74ᶜ and secured in this position, so that this member may be adjusted to the angle desired for the operation of the device.

It will be understood that, while the worm wheel 14 may be driven by the worm 13, the reverse is not true. Therefore, a pull upon the free end of the tape will not serve to draw the tape from the roll unless the motor is energized, so that the tape is dispensed from the machine only by operation of the motor.

While we have shown and described some preferred embodiments of our invention, it will be understood that it is not to be limited to all of the details shown, but is capable of modification and variation within the spirit of the invention and within the scope of the claims.

What we claim is:

1. A tape-dispensing machine comprising means for supporting a supply roll of tape, feeding mechanism for drawing said tape from said roll, motor-operated means for actuating said feeding mechanism, switch means to control said motor, a movable tape-engaging member adapted to be moved by a manual pull upon the tape in a direction to draw it from the machine, a movable severing member adjacent the path of the tape as it leaves the feeding mechanism adapted to be moved by a manual pull of the tape thereagainst to sever the tape, operative means of connection between said tape-engaging member and said switch means whereby movement of said tape-engaging member upon a manual pull upon the tape in a direction to draw it from the machine actuates said switch means to energize the motor, and operative means of connection between said severing member and said switch means whereby movement of said severing member by a manual pull of the tape thereagainst actuates said switch means to deenergize the motor and arrest feeding of the tape.

2. A tape-dispensing machine comprising means for supporting a supply roll of tape, feeding means for drawing the tape from the roll, motor-operated means for actuating said feeding means, a movable severing member mounted adjacent the path of the tape as it is delivered by said feeding means and adapted to be moved by manual pull of the tape thereagainst, said severing means acting to sever the tape when so pulled, switch means for controlling the operation of said motor-operated means, and operative means of connection between said switch means and said severing member whereby movement of said severing member by manual pull of the tape thereagainst to sever the tape actuates said connecting means to operate the switch to control the actuation of said motor-operated means.

3. A tape-dispensing machine comprising means for supporting a supply roll of tape, feeding means for drawing the tape from the roll, tape-severing means for the tape being delivered by said feeding means comprising a movable severing member against which the tape is moved by a manual pull on the tape to sever the same, power-operated means for actuating said feeding means, switch means to control said power-operated means, tape-engaging means movably mounted adjacent the path of the tape and shifted by manual pull on the unsevered end of the tape being delivered from the supply roll, and operative means of connection to said switch from said severing means and from said tape-engaging means whereby feed of the tape is initiated by movement of said tape-engaging means by a manual pull on the tape in a direction to draw it from the machine and is arrested by movement of the severing means effected by a manual pull of the tape thereagainst to sever the tape.

4. A tape-dispensing machine comprising a frame, means thereon for supporting a supply roll of tape, power-operated feeding means for drawing tape from the roll and moving it forwardly, tape-severing means movably mounted on the frame for the forwardly moving portion of the tape, tape-engaging means shiftable by manual pull on the unsevered end of the tape forwardly of the feeding means, and means connecting said feeding means with the tape-severing means and with the tape-engaging means whereby feeding is initiated by movement of the tape-engaging means upon manual pull on the tape in a direction to draw it from the machine and arrested by movement of the severing means upon manual pull of the tape thereagainst to sever the tape.

5. A tape-dispensing machine comprising means for supporting a supply roll of pressure-sensitive tape, feeding mechanism for drawing the tape from said roll having means engaging the tacky side of the tape, motor-operated means for actuating said feeding mechanism, a movably mounted severing means adjacent the path of the tape as it leaves said feeding mechanism and adapted to be moved by a manual pull of the tape thereagainst, switch means to start and stop said motor-operated means, and means connecting said severing means to said switch means to open said switch when the severing means is moved by a manual pull of the tape thereagainst to sever the tape.

6. A tape-dispensing machine, comprising means for supporting a supply roll of tape, feeding means for drawing tape from the roll, motor-operated means for actuating said feeding means, a movable severing member mounted adjacent the path of the tape as it is delivered by said feeding means, said severing member acting to sever the tape being delivered which is pulled manually against the severing member, switch means for controlling the operation of said motor-operated means, operative means of connection between said switch means and said severing member whereby the movement of the severing member controls the actuation of the motor-operated means, and means for preventing actuation of the switch by said severing member.

7. A mechanism for dispensing pressure-sensitive tape, comprising means for supporting a supply roll of tape, feeding mechanism for drawing tape from said roll by engagement of the tape therewith, an electric motor for driving said feeding mechanism, switch mechanism for controlling the motor, a movable cover for said feeding mechanism, a switch-actuating member, and means controlled by movement of the cover for preventing actuation of the switch by the actuating member.

8. A mechanism for dispensing pressure-sensitive tape, comprising means for supporting a supply roll of tape, feeding mechanism for drawing tape from said roll by engagement of the tape therewith, an electric motor for driving said feeding mechanism, switch mechanism for controlling the motor, a cover for said feeding mechanism movable in opposite directions to open or closed position, a switch-actuating member, and means controlled in accordance with movement of the cover in either of two opposite directions for preventing actuation of the switch by the actuating member.

9. A mechanism for dispensing pressure-sensitive tape, comprising means for supporting a supply roll of tape, feeding mechanism for drawing tape from said roll by engagement of the tape therewith, an electric motor for driving said feeding mechanism, switch mechanism for controlling the motor, a cover for said feeding mechanism movable to open position, means for movably mounting said switch mechanism as a whole, and means actuated by movement of the cover to open position for moving said switch mechanism as a whole.

10. A mechanism for dispensing pressure-sensitive tape, comprising means for supporting a supply roll of tape, feeding mechanism for drawing tape from said roll by engagement of the tape therewith, an electric motor for driving said feeding mechanism, switch mechanism for controlling the motor, a movable cover for said feeding mechanism, a switch-actuating member, means for movably mounting said switch mechanism as a whole, and means actuated by movement of the cover for moving said switch mechanism to a position to render said switch-actuating member inoperative to close the switch.

11. A mechanism for dispensing pressure-sensitive tape, comprising means for supporting a supply roll of tape, feeding mechanism for drawing tape from said roll by engagement of the tape therewith, an electric motor for driving said feeding mechanism, switch mechanism for controlling the motor, means for movably mounting said switch mechanism as a whole, a switch-actuating member, and means for moving said switch mechanism as a whole to a position wherein said switch-actuating member is inoperative to close the switch.

12. A mechanism for dispensing pressure-sensitive tape, comprising means for supporting a supply roll of tape, feeding mechanism for drawing tape from said roll by engagement of the tape therewith, an electric motor for driving said feeding mechanism, switch mechanism for controlling the motor, a hinged cover for said feeding mechanism, means for movably mounting said switch mechanism as a whole, and a connection between said cover and said switch mechanism whereby the latter is moved to an inoperative position when the cover is moved about its hinge.

ALFRED P. KRUEGER.
OSCAR P. ERHARDT.

References Cited in the file of this patent

UNITED STATES PATENTS

| Number | Name | Date |
| --- | --- | --- |
| 1,972,851 | McCarthy | Sept. 4, 1934 |
| 2,041,831 | Helsel | May 26, 1936 |
| 2,097,485 | Helsel | Nov. 2, 1937 |
| 2,243,112 | Morrissey | May 27, 1941 |
| 2,275,409 | Anderson | Mar. 10, 1942 |
| 2,277,514 | Elser | Mar. 24, 1942 |
| 2,405,790 | Krueger | Aug. 13, 1946 |
| 2,407,300 | Smith | Sept. 10, 1946 |
| 2,434,996 | Gautier | Jan. 27, 1948 |